United States Patent [19]
Ellis

[11] 3,724,759
[45] Apr. 3, 1973

[54] DRIVE MECHANISM
[75] Inventor: Peter H. Ellis, Chula Vista, Calif.
[73] Assignee: Rohr Industries, Inc., Chula Vista, Calif.
[22] Filed: Dec. 2, 1971
[21] Appl. No.: 204,387

Related U.S. Application Data

[62] Division of Ser. No. 6,739, Jan. 29, 1970, abandoned.

[52] U.S. Cl. ............239/265.29, 74/805, 239/265.39
[51] Int. Cl. ..............................................B64c 15/06
[58] Field of Search.......239/265.19, 265.25, 265.27, 239/265.29, 265.37, 265.39; 74/805

[56] References Cited

UNITED STATES PATENTS

| | | | |
|---|---|---|---|
| 2,256,055 | 9/1941 | Probst | 74/805 |
| 2,697,907 | 12/1954 | Gaubatz | 239/265.39 |
| 2,838,952 | 6/1958 | Seeliger | 74/805 X |
| 3,655,133 | 4/1972 | Medawar et al. | 239/265.31 |

Primary Examiner—Richard A. Schacher
Assistant Examiner—Michael Mar
Attorney—George E. Pearson and Edwin D. Grant

[57] ABSTRACT

An input shaft is rotatably mounted within a tubular casing and has an eccentric double-gear pinion rotatably mounted thereon. When input shaft rotates, one of the pinion gears rolls epicyclicly around an internal spur gear fixedly attached to inner side of the casing and the other pinion gear rolls epicyclicly around an internal spur gear fixed to one end of an output shaft which supports one end of the input shaft and which is itself journalled within the casing for rotation about the axis of said input shaft. A lever arm is connected to the output shaft and extends through an aperture in the side wall of the casing. Meshed pairs of the pinion gears and spur gears have different numbers of teeth, and cause output shaft to rotate at much lower speed than input shaft.

1 Claim, 5 Drawing Figures

DRIVE MECHANISM

This application is a division of Ser. No. 6,739, filed Jan. 29, 1970, now abandoned.

SUMMARY OF THE INVENTION

This invention relates to an improved drive mechanism and, more particularly, to a gear drive assembly that can advantageously be used to deploy and retract aircraft thrust reversing doors and the like.

In certain arrangements for reversing the thrust of jet-propelled aircraft, it is necessary to deploy and retract, in synchronization, a relatively large number of vanes mounted in spaced relation around an engine housing or a cowling associated therewith. The drive mechanism disclosed herein is well-suited for use in an actuation system for such vanes, being designed so that it is compact, light in weight, adapted to be connected in series and driven by a single motor, and capable of producing high output torque. The same characteristics will of course make the invention advantageous for many other uses.

In the preferred form of the invention a first internal spur gear is fixedly mounted within one end of a tubular casing. An aperture is formed in the wall of the casing on one side of the first spur gear, and a tubular output shaft is journalled within the casing in coaxial relation with the first spur gear and extends from a point located between the latter and the aforesaid aperture to a point located on the opposite side of the aperture. A second internal spur gear is integrally formed on and extends around the inner surface of the output shaft at the end thereof that is adjacent the first spur gear. An input shaft is coaxially disposed within and journalled to the tubular output shaft and projects from opposite ends thereof, the ends of said input shaft terminating at the openings in the ends of the casing. On the side of the first spur gear which is remote from the output shaft the input shaft is also journalled to the casing. Eccentrically and rotatably mounted on the input shaft is a double gear pinion, the gears of which respectively engage the first and second spur gears and roll epicyclicly around the same when the input shaft rotates. The stationary first spur gear has more teeth than the pinion gear engaged therewith, and the second spur gear on the rotatable output shaft also has more teeth than the pinion gear engaged therewith. Thus when the input shaft rotates, the pinion is caused to rotate about the input shaft at an angular velocity which is much less than the angular velocity of the input shaft, and the output shaft is caused to rotate about its longitudinal axis at an angular velocity which is much less than the angular velocity of the pinion relative to the input shaft. At least one lever arm is fixedly connected at one end to the output shaft and extends through the aperture in the side of the casing, and the outer end of this lever arm can be connected to a member which must be selectively moved in opposite directions at different times, such as thrust reversing vane of an aircraft jet propulsion assembly.

DETAILED DESCRIPTION

Figure 1:
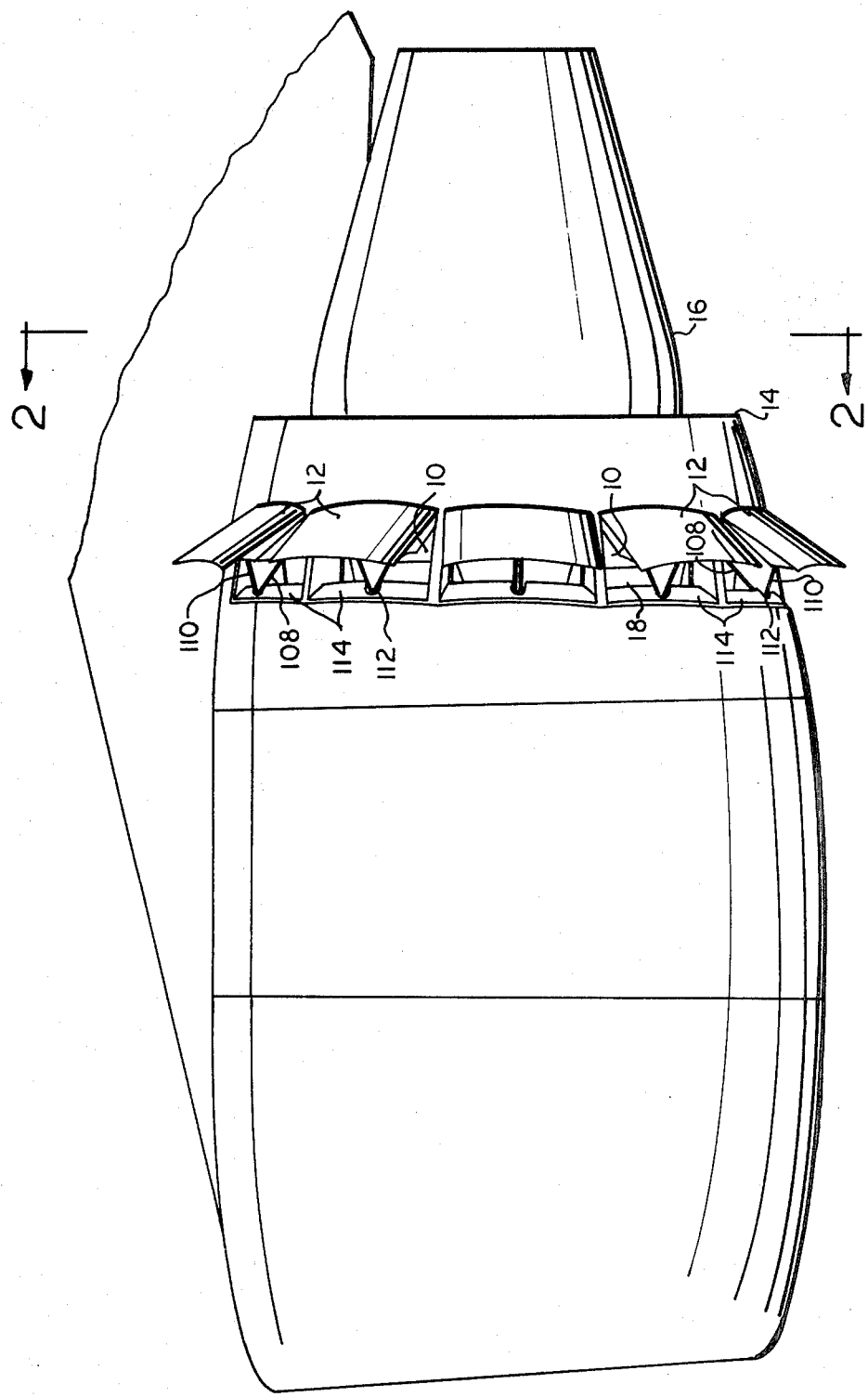
FIG. 1 is a side elevation of an aircraft jet propulsion assembly in which drive mechanisms in accordance with this invention are incorporated, said mechanisms being enclosed in the wall of a cowling of said assembly and their lever arms being respectively connected by means of links to a plurality of thrust reversing vanes, or doors, which are pivoted to said cowling and illustrated in their deployed position.

Except for a different actuation system which will be described herein, the aircraft thrust reversing apparatus illustrated in FIG. 1 is identical to that disclosed in U.S. Patent application Ser. No. 6,694, filed on Jan. 29, 1970, by Peter H. Ellis and Samuel I. Persky and assigned by them to Rohr Corporation, the assignee of the present application. As explained in greater detail in the noted application, the aforesaid apparatus comprises a plurality of thrust reversing vanes 10, 12 (or doors) pairs of which are respectively located on the inner and outer sides of a cowling 14 disposed in concentric, spaced relation around the housing 16 of a turbofan jet engine. The vanes are pivoted to the cowling so that they can be moved between a retracted position wherein they are respectively flush with the inner and outer surfaces of said cowling and close openings 18 therein, and a deployed position wherein the inner doors are swung inwardly across the annular space between the cowling and the engine housing and the outer doors are swung outwardly from the cowling, this deployed position of the vanes being illustrated in FIG. 1. When the vanes are in their deployed position fan air which flows through the passage between the cowling and the housing is deflected through openings 18 and then forwardly, thereby reversing the thrust of the propulsion assembly.

Figure 2:
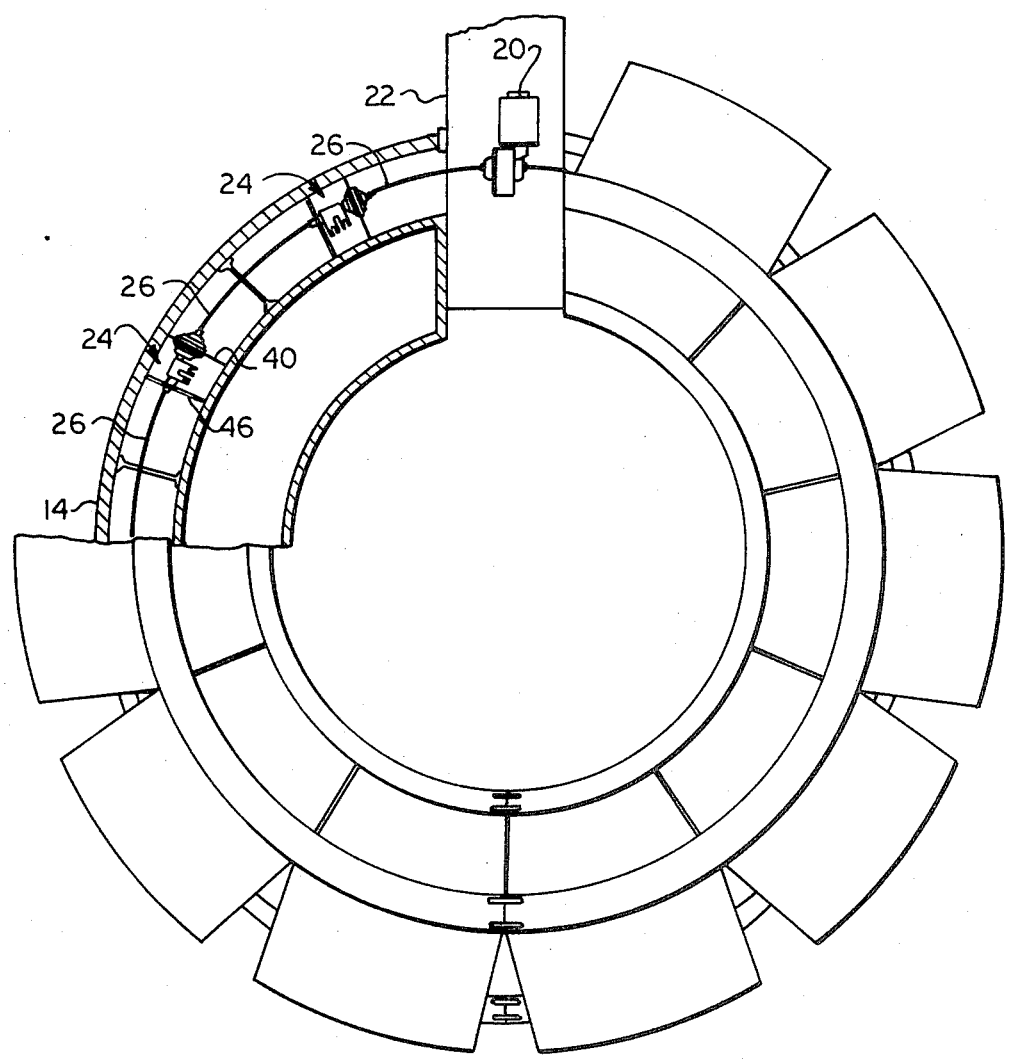
FIG. 2 is a fragmentary cross-sectional view of the aforesaid cowling, taken along the planes represented by line 2—2 in FIG. 1 and in the direction indicated by arrows, the drawing illustrating typical ones of the drive mechanism of the invention.

As illustrated in FIG. 2, a drive motor 20, which may be of any suitable type, is mounted within the pylon 22 on which cowling 14 and housing 16 are supported. Disposed within the wall structure of the cowling immediately forward of the openings 18 therein are a plurality of drive mechanisms each designated generally by reference number 24. The drive mechanisms on each side of the cowling are operatively connected to motor 20 and to one another by means of flexible shafts enclosed in conduits 26.

Figure 3:
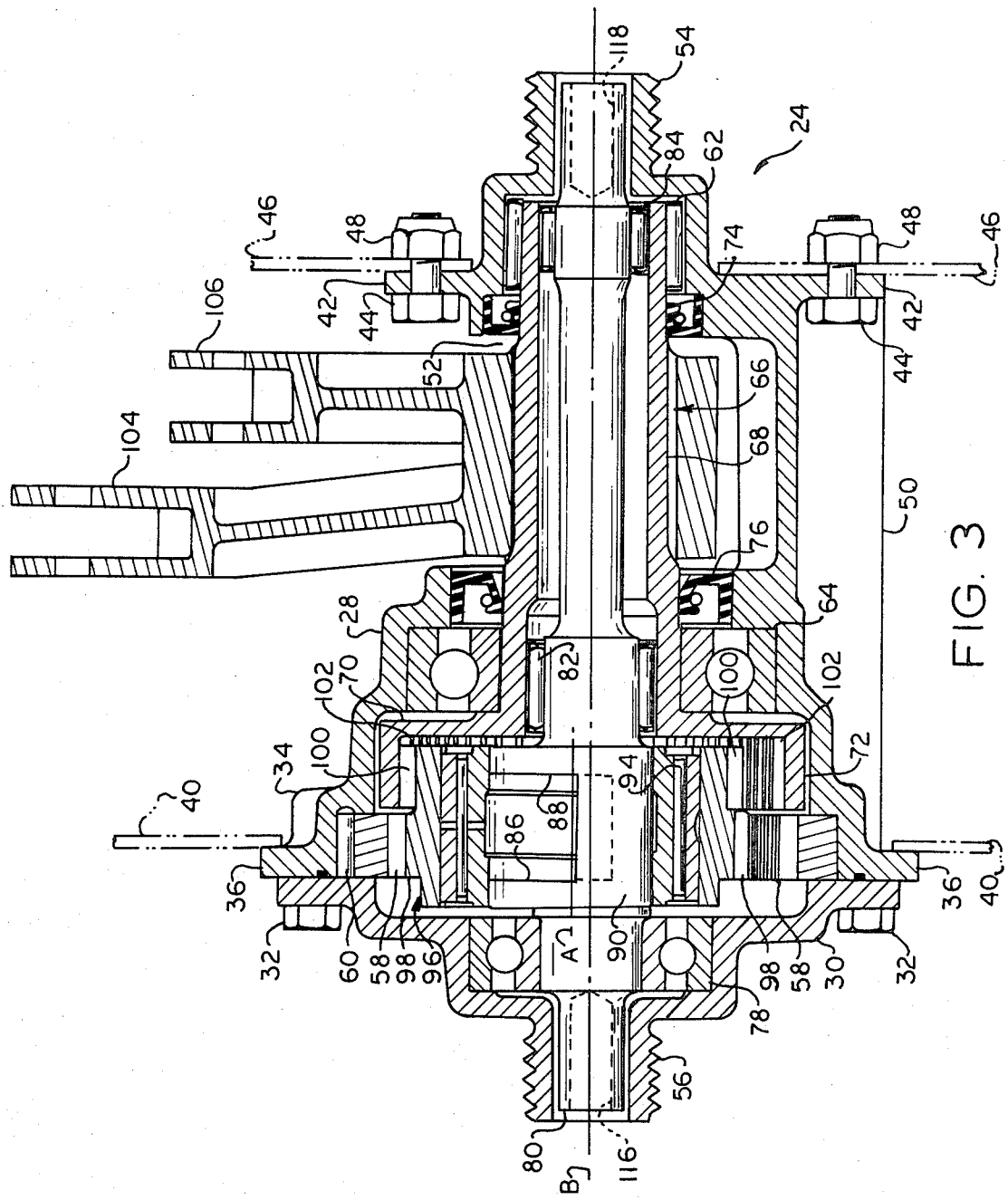
FIG. 3 is an enlarged, longitudinal sectional view of one of the drive mechanisms illustrated in FIG. 2.
Figure 4:
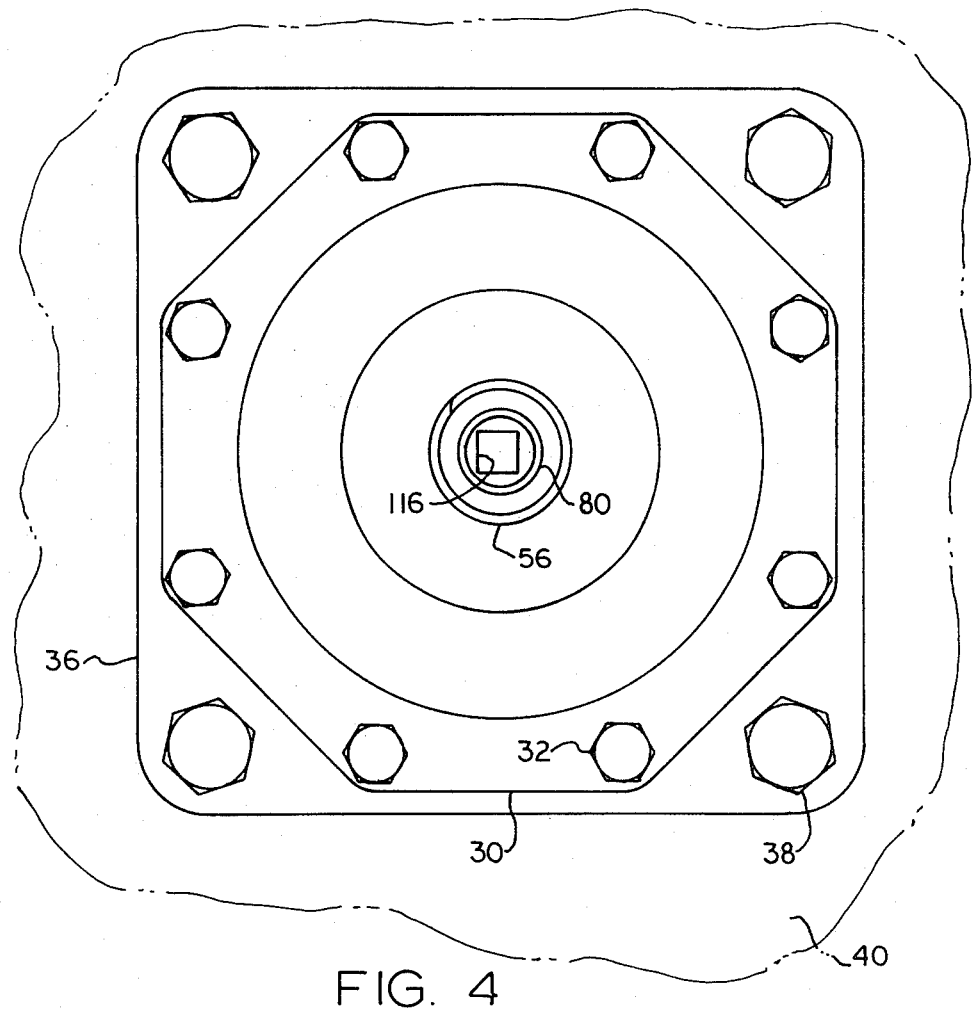
FIG. 4 is an end view of the casing of the mechanism illustrated in FIG. 3.

It can be seen in FIG. 3 that each drive mechanism 24 comprises a casing formed of a tubular member 28 and a cap 30, the two parts of the casing being joined together by means of cap screws 32 which engage tapped holes in bosses 34 formed on casing 28. The end of member 28 to which cap 30 is attached is formed with a mounting flange 36 (see FIG. 4), and the shanks of four bolts 38 respectively pass through holes in the corners of said flange and holes in a wall member 40 of cowling 14, nuts which are not shown being engaged with the ends of these bolts. A mounting flange 42 is spaced from the opposite end of member 28, and the shanks of four bolts 44 (only two of which are illustrated, in FIG. 3) also respectively pass through holes in the corners this flange and holes in a second wall member 46 of the cowling, a nut 48 being engaged with each bolt 44. Two ribs 50 (only one of which is illustrated, in FIG. 3) are integrally formed on member 28 and extend in spaced, parallel relation between flanges 36 and 42 on one side of said member to increase its rigidity. An aperture 52 extends through the opposite side of member 28, and both said member and cap 30 have tubular ends 54, 56 which are coaxial and formed with threads on their peripheries. A first internal spur gear 58 (i.e., a ring gear having teeth on the inner edge thereof) is seated within a recess formed in the end of member 28 which is adjacent cap 30, and a pin 60 is keyed to said member and said gear to hold the same in fixed position relative to each other.

The tubular portion of member 28 which extends between flange 42 and end 54 has a larger diameter than said end, and a first bearing 62 is positioned within this section of said member in a press fit. Bearing 62 is of the so-called "needle" type, and comprises a plurality of thin rollers mounted within a flanged ring. Between aperture 52 and flange 36 the diameter of member 28 increases in steps as illustrated, thus providing adjacent said aperture a recess in which the outer race of a second bearing 64 is seated in a press fit, this bearing being provided with balls instead of rollers. Designated generally by reference number 66 is an output shaft comprising a first tubular portion 68 pressed into the inner race of bearing 64 and also journalled in bearing 62, a disk 70 integrally joined to the end of portion 68 adjacent gear 58 and disposed perpendicular thereto, and a second tubular portion 72 integrally joined to the outer edge of said disk and coaxial with portion 68. Output shaft 66 is coaxial with first spur gear 58. First and second seal rings 74, 76 are disposed in sealing relation around portion 68 of the output shaft, ring 74 being pressed into the portion of member 28 which lies between aperture 52 and flange 42 and ring 76 being pressed into the portion of said member which lies between said aperture and bearing 64.

Figure 5:
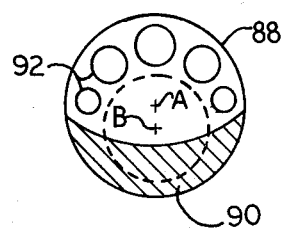
FIG. 5 is a cross-sectional view of an input shaft illustrated in FIG. 3.

The outer race of a third bearing 78 (which is of the ball type) is seated within a recess in cap 30 in a press fit and is coaxial with output shaft 66. An input shaft 80 is positioned within the inner race of bearing 78, also under a press fit, and is journalled in two needle-type bearings 82, 84 which are pressed into the aperture in output shaft 66 and respectively located at opposite ends thereof. Thus input shaft 80 is coaxial with output shaft 66 and both rotate independently. As illustrated in FIGS. 3 and 5, shaft 80 is formed with a pair of laterally projecting eccentric disks 86, 88 which are joined by an integral counterweight 90 having a crescent-shaped cross section (FIG. 5 is taken along a plane disposed between said disks 86, 88). Disks 86, 88 of the input shaft have a circular cross section and are coaxial, their common axis A being disposed in spaced, parallel relation with the longitudinal axis B of the remainder of the input shaft. A plurality of lightening holes 92 are formed in each disk 86, 88 in order to help counterbalance shaft 80 and a roller bearing 94 and an orbiting gear 96 hereinafter described.

The inner race of bearing 94 is pressed on the eccentric portion of shaft 80 in a press fit which prevents said race from shifting axially of said shaft. The aforesaid orbiting gear 96, which is generally designated by reference number 96 and is hereinafter called the "pinion," is pressed on the outer race of bearing 94 in the same manner, so that the pinion can rotate about axis B but is unable to move axially of shaft 80. The periphery of pinion 96 is formed with two rows of teeth to provide thereon first and second gears 98, 100. The eccentric arrangement of the pinion on shaft 80 is such that teeth of first gear 98 mesh with teeth of first spur gear 58, and as the shaft rotates gear 98 rolls epicyclicly around gear 58 and the teeth of said gears are successively engaged with one another. There are more teeth on gear 58 than on gear 98. Teeth of a second internal spur gear 102 are integrally formed on the inner surface of portion 72 of output shaft 66, and teeth of second pinion gear 100 mesh with teeth of said gear 102. As shaft 80 rolls gear 98 around gear 58, gear 100 rolls epicyclicly around gear 102. There are also more teeth on the second spur gear 102 than on the second pinion gear 100. More specifically, in the embodiment of the invention which is being described first spur gear 58 has 48 teeth, first pinion gear 98 has 43 teeth, second spur gear 102 has 44 teeth, and second pinion gear 100 has 39 teeth.

The portion of output shaft 66 which lies under aperture 52 has splines on its outer surface, and fits within mating apertures in two lever arms 104, 106 each of which extends laterally from said output shaft through said aperture. The outer ends of the lever arms are bifurcated and formed with apertures so that the ends of two links 108, 110 (see FIG. 1) can be respectively pivotally connected thereto. Each associated pair of these links extends through a slot 112 in a fairing 114 which is disposed aft of lever arms 104, 106 and which forms the forward edge of a respective one of the openings 18 in cowling 14. The other ends of each associated pair of links are respectively connected to the pair of vanes 10, 12 pivoted to cowling 14 adjacent the aft edge of the same opening 18.

The ends of input shaft 80 are respectively coaxially disposed within the ends 54, 56 of member 28 and cap 30 and spaced therefrom, each end of the input shaft being formed with an axially extending hole 116, 118 which is adapted to receive the mating end of a respective one of the flexible drive shafts enclosed within conduits 26.

OPERATION

The operation of motor 20 is controlled from the cockpit of the aircraft of which the illustrated and described propulsion assembly is a part, and the input shafts 80 of drive mechanisms 24 are interconnected with each other and with the motor so that when the latter is operated all of the input shafts simultaneously rotate in the same direction. Thus lever arms 104, 106 mounted on output shafts 66 can be simultaneously rotated in a selected direction at a selected time to thereby deploy or retract vanes 10, 12.

As has been stated hereinbefore, when input shaft 80 of a drive mechanism 24 is rotated, first gear 98 of pinion 96 is rolled epicyclicly around first spur gear 58, which is fixed in position within the casing of said drive mechanism. Since the number of teeth in first spur gear 58 is different from the number of teeth in first pinion gear 98, each revolution of pinion 96 around said first spur gear causes a small angular displacement of the pinion relative to axis A. Each revolution of input shaft 80 also rolls second pinion gear 100 epicyclicly around second spur gear 102, which has fewer teeth than said second pinion gear. Thus output shaft 66 is rotated in accordance with a gear ratio which, for the given number of teeth in the spur and pinion gears, can be calculated as follows:

$$\text{Gear ratio} = 48/43 \cdot 39/44 = 1872/1892$$

$$1 - (1872/1892) = 20/1892 = 1/94.6$$

That is, 94.6 revolutions of input shaft 80 effect one revolution of output shaft 66. Since a plurality of teeth are meshed in the spur and pinion gears as pinion 96 revolves, the described mechanism is capable of exerting relatively large torque upon lever arms 104 and 106 without damaging said teeth. It will be seen that the drive system thus provided is compact and light in weight, as well as being adaptable for many different applications where a plurality of vanes or other devices are preferably actuated by a single power source. It will be obvious that various changes can be made in the construction and arrangement of the mechanism which has been disclosed, without departing from the basic design thereof. Hence the scope of the invention should be considered to be limited only by the terms of the appended claims.

What is desired to be protected by U. S. Letters Patent is:

1. In an aircraft wherein a plurality of vanes are pivoted to and spaced circumferentially about a wall structure, means for rotating said vanes comprising: a plurality of drive mechanisms mounted on said wall structure and respectively located adjacent said vanes, each of said mechanisms comprising a tubular casing open at both ends, a first internal spur gear fixedly extending around the inner surface of said casing at one end thereof, a tubular output shaft disposed within and journalled to said casing in coaxial relation with said first spur gear, said output shaft extending under the aperture in said casing and terminating at a point between said aperture and said first spur gear, a second internal spur gear fixedly disposed on said output shaft at the end thereof adjacent said first spur gear, said second spur gear being coaxial with said output shaft, an input shaft rotatably mounted within said output shaft and extending between the openings in the ends of said casing and aligned therewith, a pinion mounted on said input shaft for rotation about an axis spaced from and parallel with the longitudinal axis of said input shaft, said pinion being formed with first and second gears which respectively mesh with and roll epicyclicly around said first and second spur gears when said input shaft rotates, the number of teeth in said first and second pinion gears being respectively different from the number of teeth in said first and second spur gears, and a lever arm fixedly connected at one end to said output shaft and extending laterally therefrom through the aperture in said casing: drive means connected to the input shaft of one of said mechanisms and operable to selectively rotate the same in opposite directions; means respectively interconnecting the input shafts of adjacent pairs of said mechanisms, whereby when said drive means rotates the input shaft of said one mechanism the input shafts of the other mechanisms are also rotated; and a plurality of links respectively pivoted at one end to the free ends of the lever arms of said mechanisms and pivoted at the other end to said vanes.

* * * * *